(12) United States Patent
Chen et al.

(10) Patent No.: US 6,806,929 B2
(45) Date of Patent: Oct. 19, 2004

(54) TRANSFLECTIVE LCD DRIVEN BY BI-GAMMA CURVE

(75) Inventors: Ching-Yih Chen, Miaoli (TW); Yuh-Ren Shen, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/294,751

(22) Filed: Nov. 15, 2002

(65) Prior Publication Data

US 2003/0184695 A1 Oct. 2, 2003

(30) Foreign Application Priority Data

Mar. 28, 2002 (TW) ........................................ 91106178 A

(51) Int. Cl.[7] ...................... G02F 1/1343; G02F 1/1335
(52) U.S. Cl. ........................ 349/114; 349/38; 349/113; 349/143
(58) Field of Search ................................ 349/114, 113, 349/38, 143, 92; 257/59, 72

(56) References Cited

U.S. PATENT DOCUMENTS

| | | | | |
|---|---|---|---|---|
| 6,704,081 B2 | * | 3/2004 | Ha et al. | 349/114 |
| 2001/0052948 A1 | * | 12/2001 | Okamoto et al. | 349/12 |
| 2002/0109848 A1 | * | 8/2002 | Hendriks et al. | 356/484 |

* cited by examiner

*Primary Examiner*—Huyen Ngo
(74) *Attorney, Agent, or Firm*—Birch, Stewart, Kolasch & Birch, LLP

(57) ABSTRACT

A transflective LCD. The transflective LCD includes multiple pixels. Each pixel includes a reflective cell and a transmission cell. The reflective cell has a first storage capacitor and a first active device, receiving a first driving voltage and coupling to the first capacitor. The transmission cell has a second storage capacitor and a second active device, receiving a second driving voltage and coupling to the second capacitor. Different from only single driving voltage in conventional transflective LCD, the first driving voltage and the second voltage are generated according to a reflective gamma curve and a transmission gamma curve respectively.

17 Claims, 19 Drawing Sheets

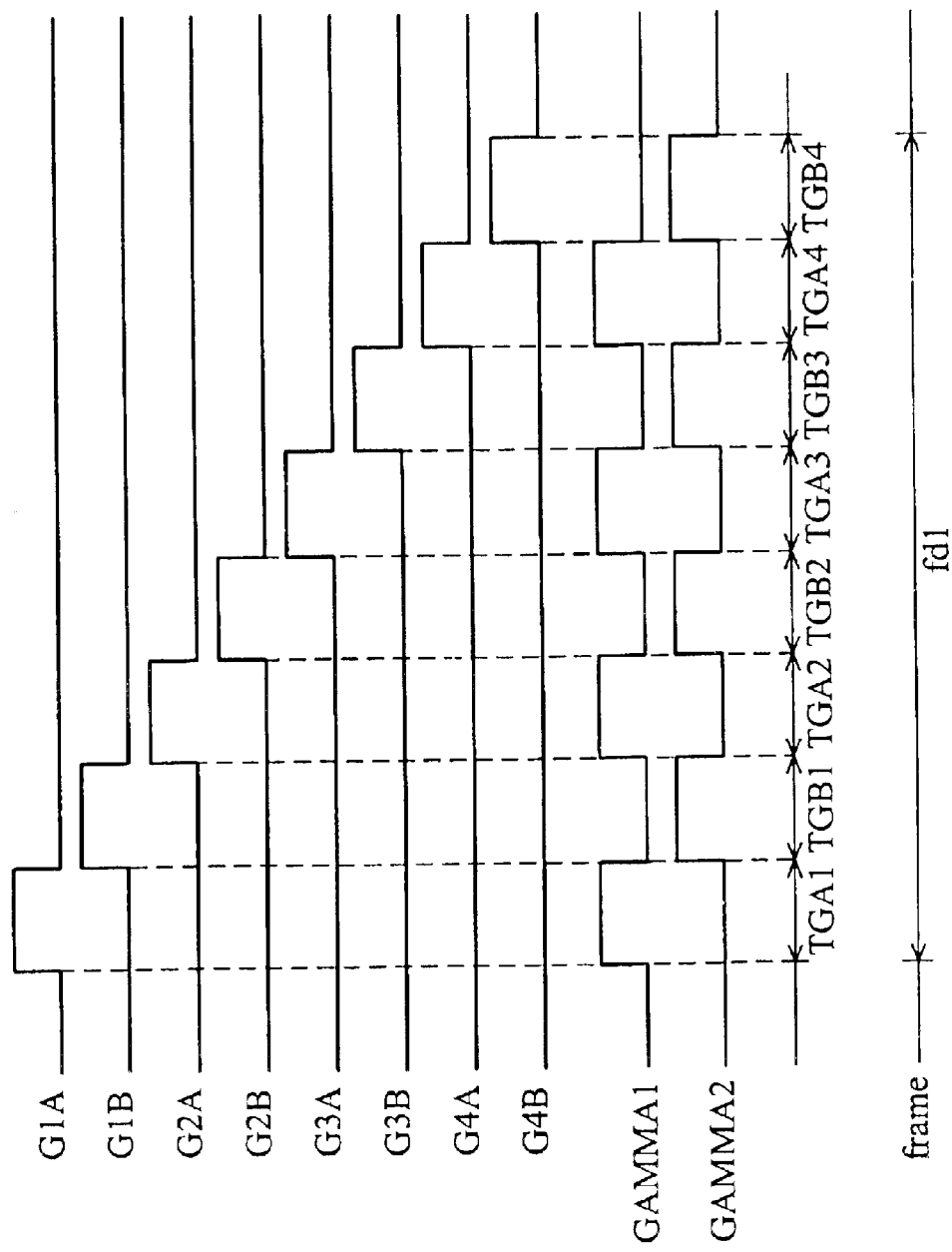

TRANSFLECTIVE LCD DRIVEN BY BI-GAMMA CURVE

BACKGROUND OF THE INVENTION

1. Field of the Invention

The present invention relates to a transflective LCD, and particularly to a transflective LCD driven by bi-gamma curve.

2. Description of the Related Art

A pixel of the conventional transflective LCD has a transmission region and a reflective region. Unavoidably, the reflective region has a nearly double phase difference nearly double that of the transmission region. Reduction of cell gap of the reflective region to approach that of the transmission region has been adopted in the past to address this issue. FIG. 7A shows a perspective diagram of a pixel of a conventional transflective LCD. The pixel includes a reflective region 10 and a transmission region 20. The reflective region 20 has a reflective film 12 and a cell gap d1. The transmission region 20 has a cell gap d2.

An equivalent circuit is shown in FIG. 7B. The reflective region 10 and the transmission region 20 are both coupled to a storage capacitor Cs and a TFT (thin-film-transistor) transistor T1. Thus, only driving voltage is afford to supply. The anti-inversion approach adjusts the cell gap d1 and the cell gap d2 to the same phase difference. The cell gap d1 and d2 must be optimized to fit the LCD's operation mode, an approach that is difficult to adjust.

SUMMARY OF THE INVENTION

It is therefore an object of the present invention to provide a transflective LCD that achieves optimal reflectivity and transmittance.

To achieve the above objects, the present invention provides a pixel with reflective region and transmission regions. The reflective region and the transmission region both have a storage capacitor and a TFT transistor for different driving voltages. The driving voltage for the reflective region can have any phase difference in cell gap such as half wave or quarter wave. The driving voltage for the transmission region can have any phase difference in cell gap such as half wave or quarter wave.

A driving method for the transflective LCD scans all reflective regions first in a frame period, with all transmission regions are scanned later.

Another driving method for the transflective LCD scans all reflective regions of one row first in the row's active period, and all transmission regions of one row thereof latter.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The aforementioned objects, features and advantages of this invention will become apparent by referring to the following detailed description of the preferred embodiments with reference to the accompanying drawings, which are given by way of illustration only, and thus are not limitative of the present invention, and wherein:

FIG. 3D shows a diagram of all waveforms in FIG. 3B.

DETAILED DESCRIPTION OF THE INVENTION

Figure 1A:
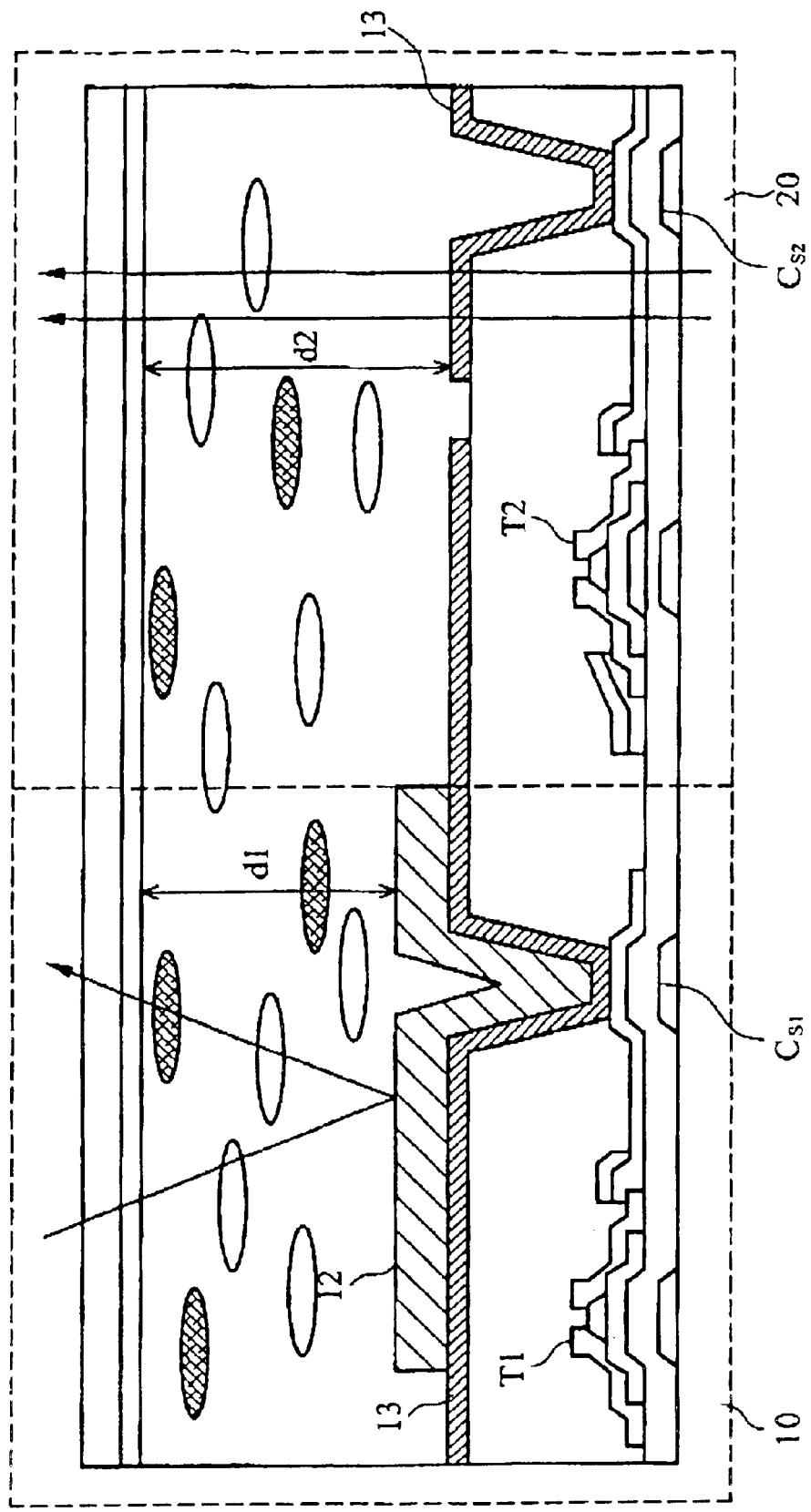
FIG. 1A shows a perspective diagram in a pixel's structure of a transflective LCD of the present invention.
Figure 1B:
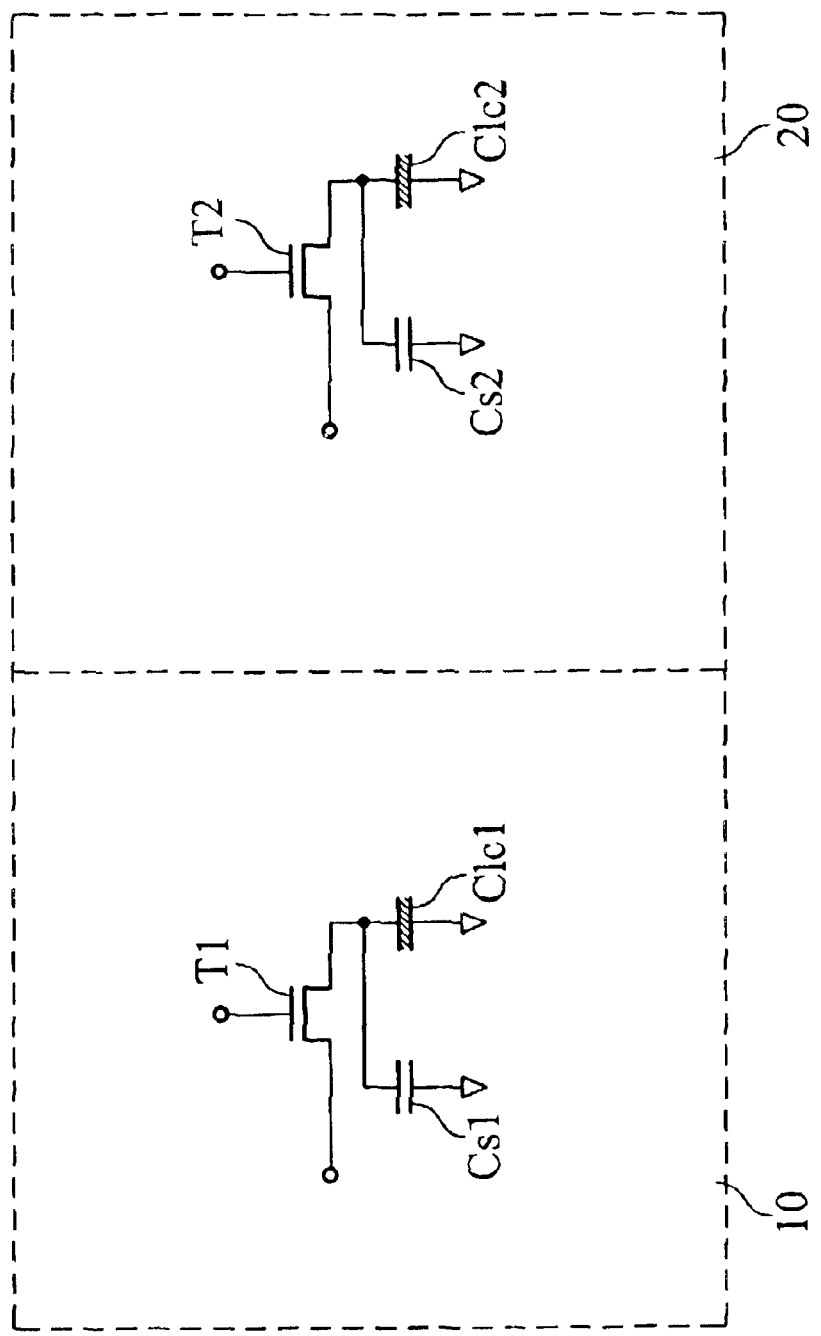
FIG. 1B shows an equivalent circuit of the pixel in FIG. 1A.

FIG. 1A shows a perspective diagram in a pixel's structure of a transflective LCD of the present invention. The pixel includes a reflective region 10 and a transmission region. The reflective region 10 has a reflective film 12 and a cell gap d1. The transmission region 20 has a cell gap d2. The layer under the reflective film 12 is a layer 13 which is coupled to a storage capacitor Cs1 and a storage capacitor Cs2. FIG. 1B shows an equivalent circuit of the pixel. In the reflective region 10, an equivalent capacitor of the reflective region 10 is represented by Clc1, a storage capacitor is Cs1, and a TFT transistor is T1. In the transmission region 20, an equivalent capacitor of the transmission region 10 is represented by Clc2, a storage capacitor is Cs2, and a TFT transistor is T2. The TFT transistor T2 and T1 can be disposed under the reflective film 12.

Figure 2A:
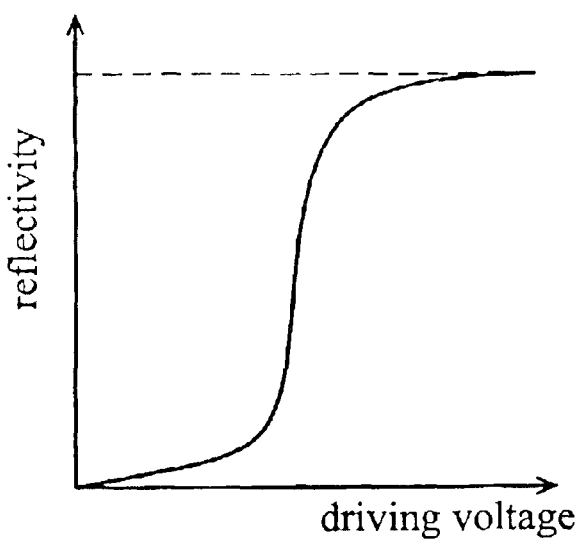
FIG. 2A shows a reflectivity gamma curve RV1 for quarter wave phase difference in the transmission region.
Figure 2B:
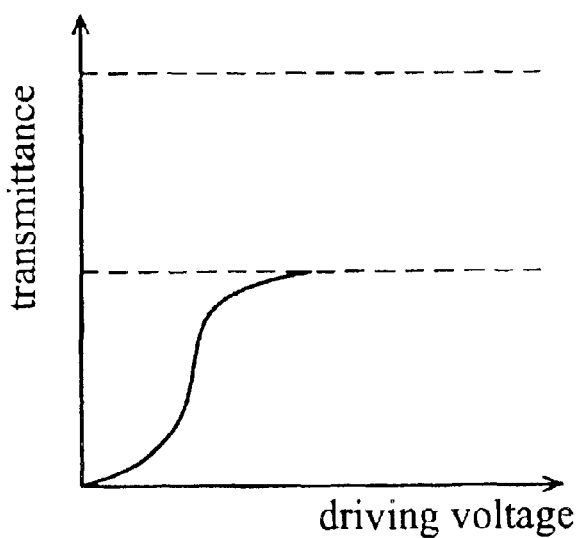
FIG. 2B shows a transmittance gamma curve TV1 for quarter wave phase difference in the transmission region.

Operating in quarter wave phase difference of the transmission region 20, a reflectivity gamma curve RV1 showing reflectivity versus driving voltage VR of the reflective region 10 is shown in FIG. 2A. Because the phase difference through the reflective region 10 is twice that of the transmission region 20, the maximum reflectivity occurs in half wave. A transmittance gamma curve TV1 showing transmittance versus driving voltage VT of the transmission region 10 is shown in FIG. 2B, and the maximum transmittance occurs in quarter wave.

Figure 2C:
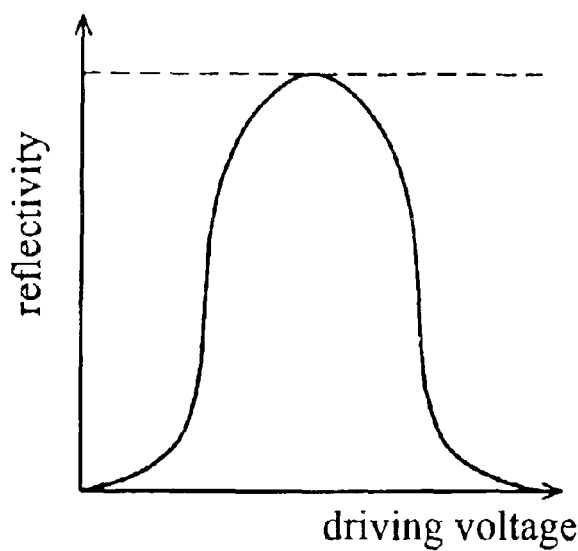
FIG. 2C shows a reflectivity gamma curve RV1 for half wave phase difference in the transmission region.
Figure 2D:
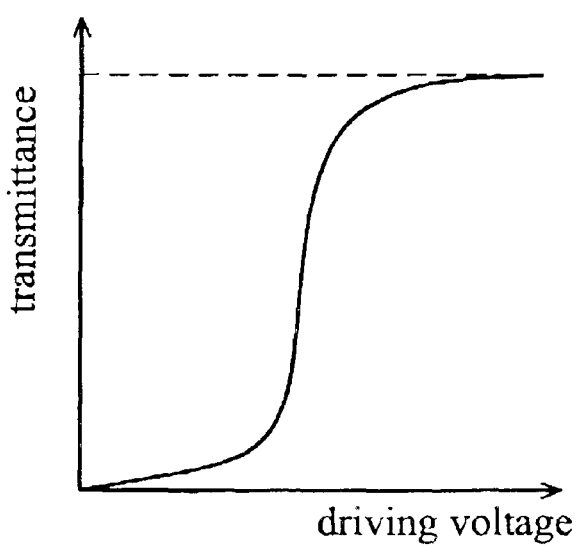
FIG. 2D shows a transmittance gamma curve TV1 for half wave phase difference in the transmission region.

Operating in half wave phase difference of the transmission region 20, a reflectivity gamma curve RV2 showing reflectivity versus driving voltage VR of the reflective region 10 is shown in FIG. 2C. Because the phase difference through the reflective region 10 is twice that of the transmission region 20, the maximum reflectivity occurs in half wave. When the phase difference exceeds half wave, the reflectivity decrease with driving voltage VR. A transmittance gamma curve TV2 showing transmittance versus driving VT of the transmission region 10 is shown in FIG. 2D, and the maximum transmittance occurs in half wave.

Because the pixel in the present invention has two TFT transistors T1 and T2, and two storage capacitors Cs1 and Cs2, to control driving voltage VR and VT respectively, the reflective region 10 and transmission region 20 achieve the same phase difference without adjusting the cell gap d1 and d2. The driving voltage VR for the reflective region 10 can be driven by the quarter wave gamma curve RV1 or by half wave gamma curve RV2. The driving voltage VT for the transmission region 20 can be driven by the quarter wave gamma curve TV1 or by half wave gamma curve TV2. The reflective region 10 and the transmission region 20 are corrected by reflectivity and transmittance gamma curve respectively to meet requirements.

In power down mode, only the reflective regions 10 are or the transmission regions 20 are powered. As well as turning off back lamps, driving circuits for transmission regions 20 can be turned off for more power saving.

The first embodiment

Figure 3A:
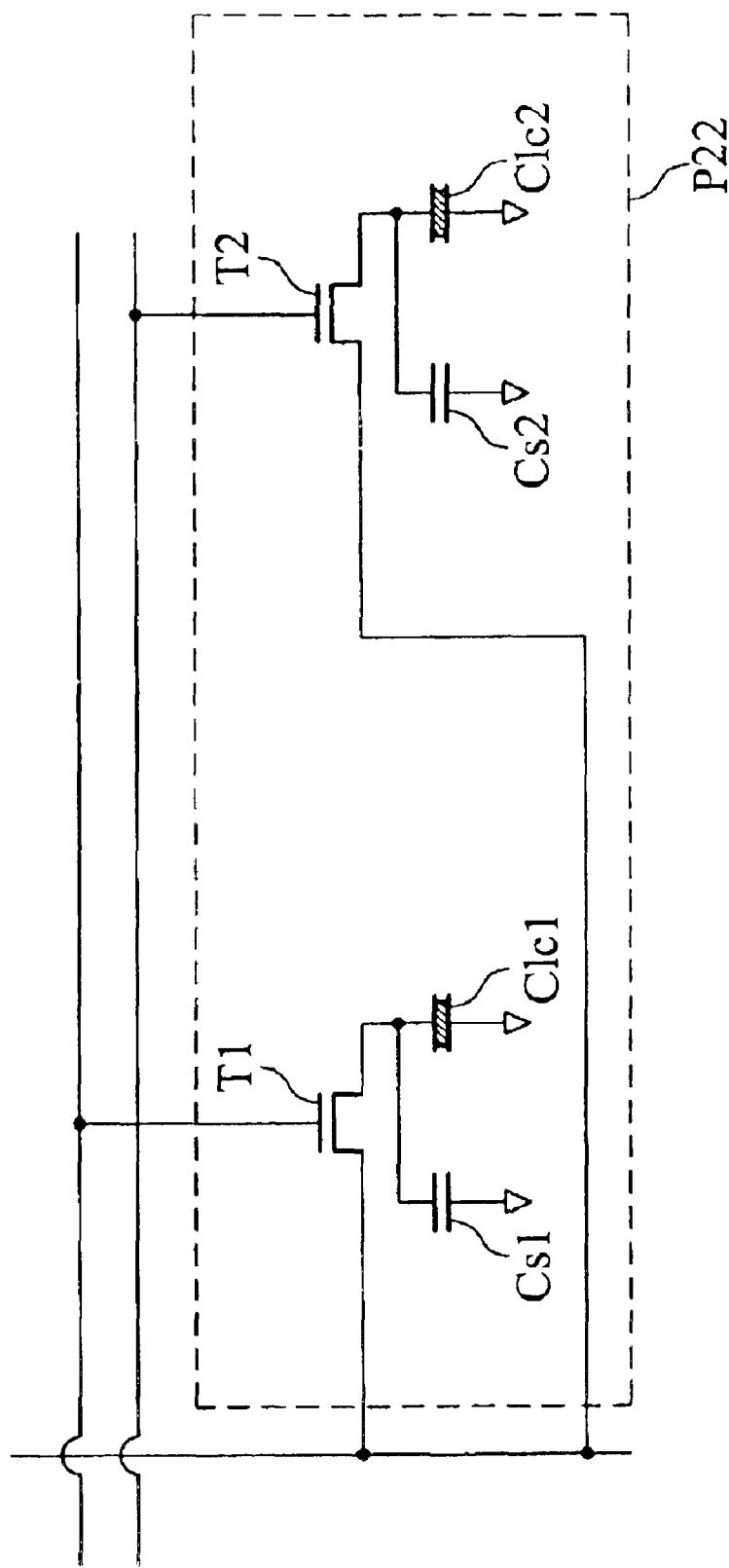
FIG. 3A shows a schematic diagram of a pixel P22 in FIG. 3B.
Figure 3B:
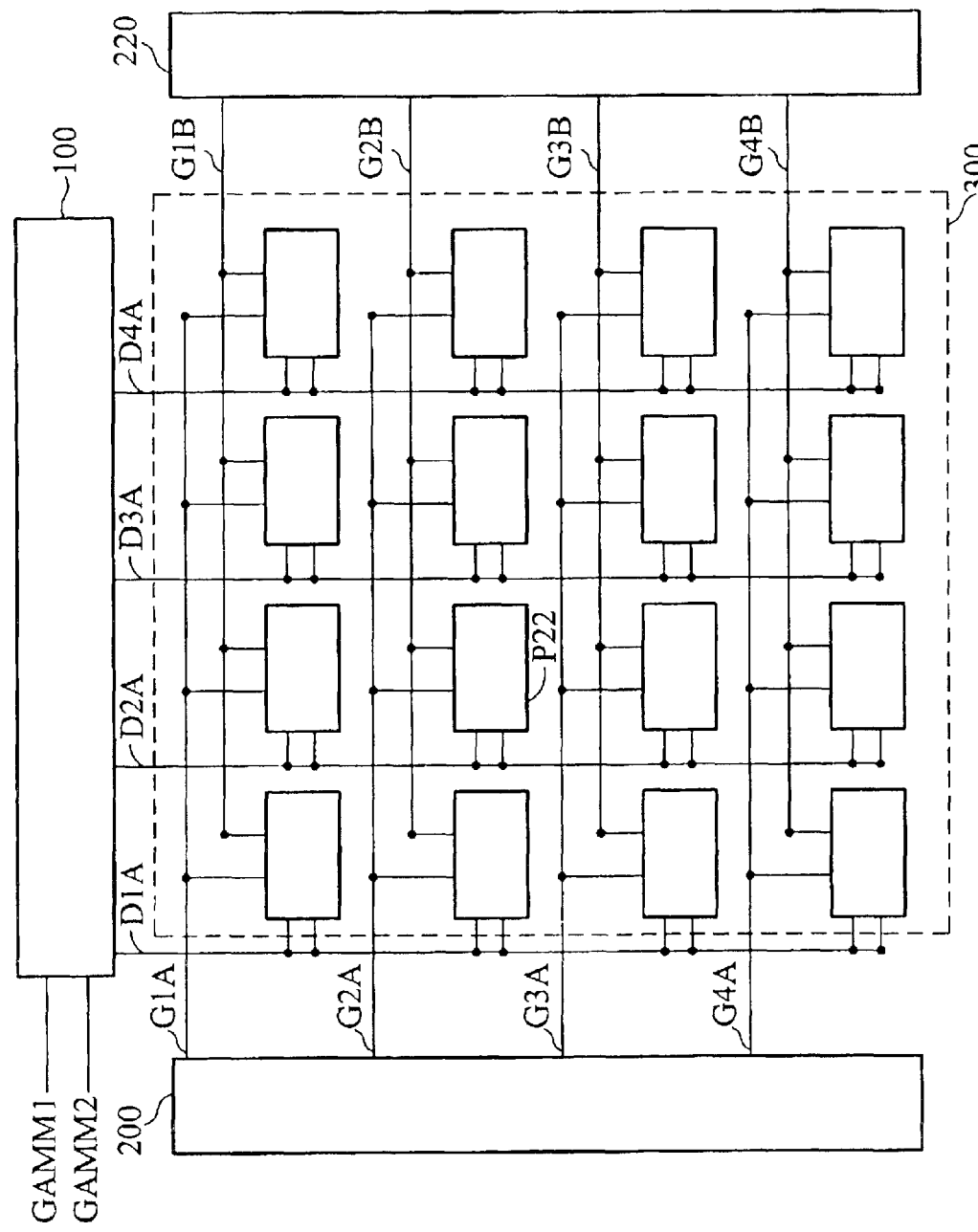
FIG. 3B shows a block diagram of a LCD in the first embodiment.

FIG. 3B shows a block diagram of a LCD in the first embodiment. The LCD includes a TFT transistor array 300, an image-signal driving circuit 100, a scan-signal driving circuit 200, and a scan-signal driving circuit 220. FIG. 3A shows a schematic diagram of a pixel P22 in FIG. 3B. Other pixels in FIG. 3B have the same schematic as shown in FIG. 3A. The pixel P22 has a reflective region 10 and a transmission region 20, and thus requires two sets of TFT transistors and storage capacitors.

The TFT transistor T1 is disposed at the intersection of row G2A and column D2A. A gate of the TFT transistor T1 is coupled to row G2A, a drain of the TFT transistor T1 is coupled to column D2A, and a source of the TFT transistor T1 is coupled to Clc1 and storage capacitor Cs1. The TFT transistor T2 is disposed at the intersection of row G2B and column D2A. A gate of the TFT transistor T1 is coupled to row G2B, a drain of the TFT transistor T1 is coupled to column D2A, and a source of the TFT transistor T2 is coupled to Clc2 and storage capacitor Cs2. All Pixels in the TFT transistor array 300 have the same wiring structure.

The scan-signal driving circuit 200 generates scan signals fed to gates of TFT transistors T1 via rows G1A–G4A. The scan-signal driving circuit 220 generates scan signals fed to gates of TFT transistors T2 via rows G1B–G4B. The image-signal driving circuit 100 generates image signals corresponding to scan signals fed to reflective region Clc1 or transmission region Clc2 via columns D1A–D4A and TFT transistor array 300.

Figure 3C:
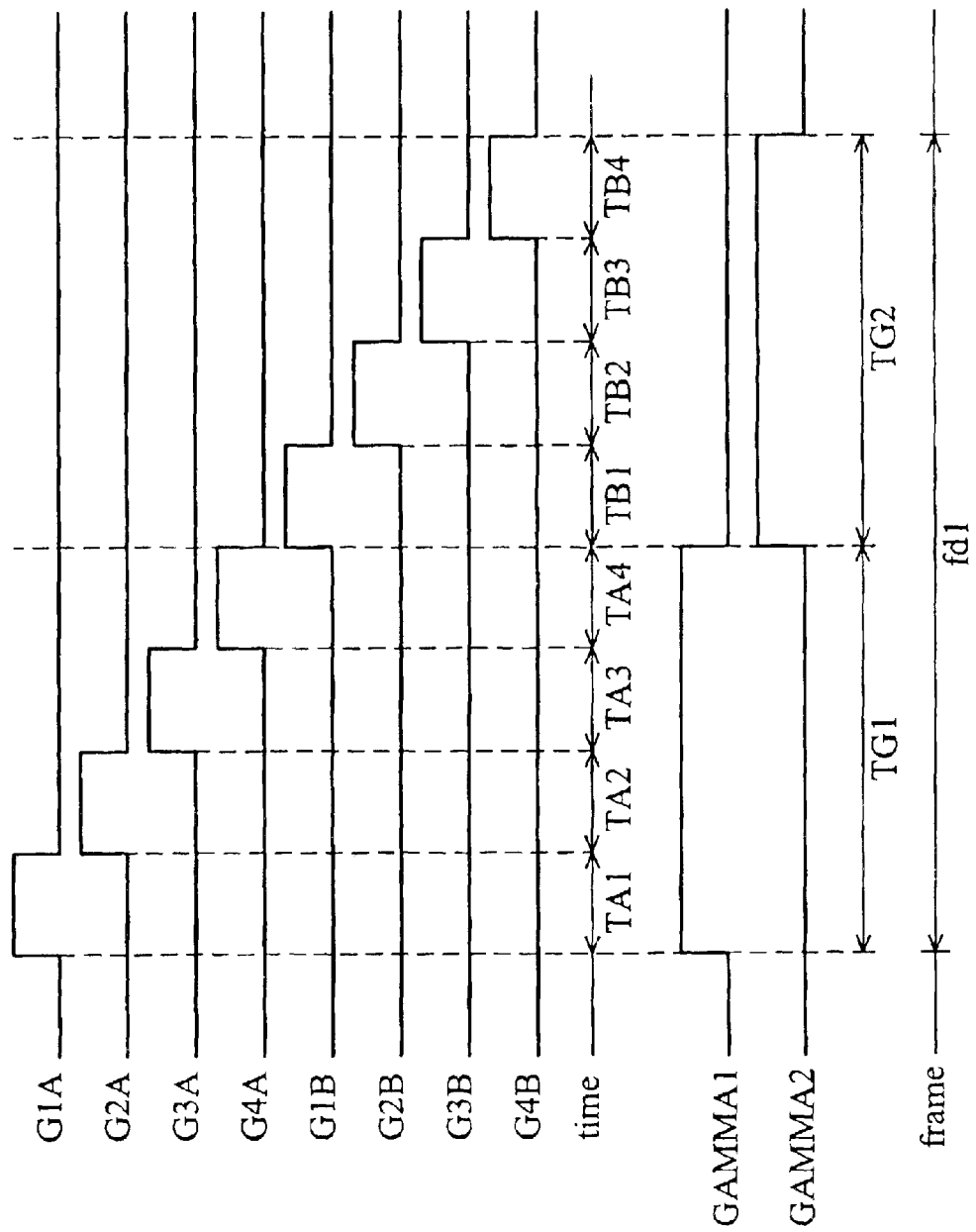
FIG. 3C shows a diagram of all waveforms in FIG. 3B.

A driving method in the first embodiment scans all reflective regions first, and all transmission regions later. FIG. 3C shows a diagram of all waveforms in FIG. 3B. The GAMMA1 can select the reflectivity gamma curve RV1 or RV2, thereby transferring the image signals. The GAMMA2 can select the transmittance gamma curve TV1 or TV2, thereby transferring the image signals. As shown in FIG. 3C, a frame period fd1 is divided into a GAMMA1 period TG1 and a GAMMA2 period TG2. In GAMMA1 period TG1, the image-signal driving circuit 100 feeds image signals to reflective regions Clc1 and storage capacitors Cs1 via columns D1A–D4A in periods TA1, TA2, TA3, and TA4, rows G1A–G4A respectively. In GAMMA2 period TG2, the image-signal driving circuit 100 feeds image signals to transmission regions Clc2 and storage capacitors Cs2 via columns D1A–D4A in periods TB1, TB2, TB3, and TB4, activating rows G1B–G4B respectively.

Another driving method in the first embodiment scans all reflective regions of one row first in one row's active period, and all transmission regions of one row later in one row's active period. FIG. 3D shows a diagram of all waveforms in FIG. 3B. As shown in FIG. 3D, in a frame fd1, GAMMA1 is active in periods TGA1, TGA2, TGA3, TGA4, and GAMMA2 is active in periods TGB1, TGB2, TGB3, and TGB4. Rows active in sequence periods G1A-G1B-G2A-G2B-G3A-G3B-G4A-G4B corresponding to the sequence periods TGA1-TGB1-TGA2-TGB2-TGA3-TGB3-TGA4-TGB4 that GAMMA1 and GAMMA2 are active alternatively. In periods TGA1, TGA2, TGA3, and TGA4, the image-signal driving circuit 100 feeds image signals to reflective region Clc1 and storage capacitor Cs1 via columns D1A–D4A in periods that rows G1A–G4A are active respectively. In periods TGB1, TGB2, TGB3, and TGB4, the image-signal driving circuit 100 feeds image signals to reflective region Clc2 and storage capacitor Cs2 via columns D1A–D4A in periods when rows G1B–G4B are active respectively.

Figure 3E:
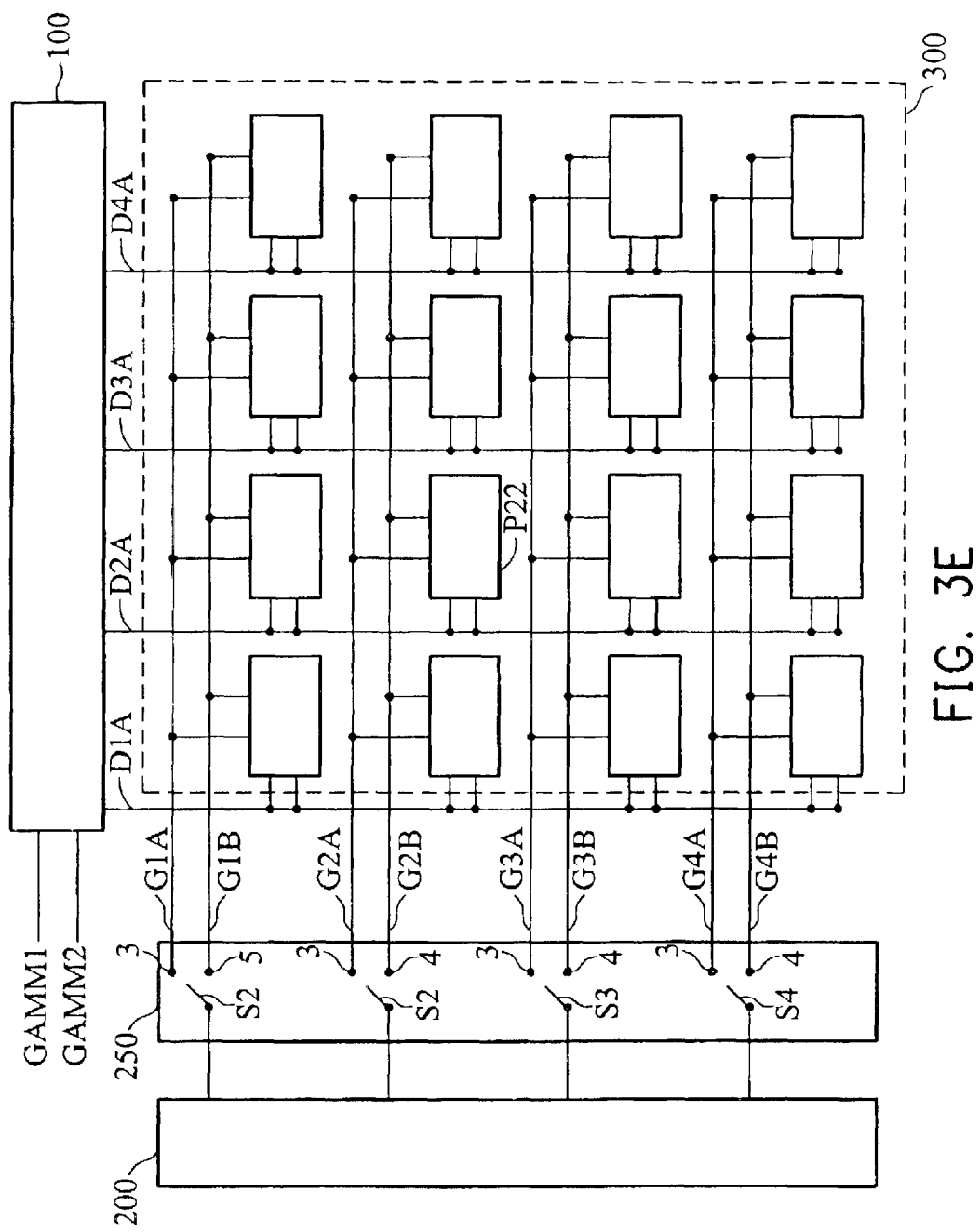
FIG. 3E shows another block diagram of a LCD in the first embodiment.

The driving method in FIG. 3E is the same as that in 3B. The scan-signal driving circuit 200 and 220 are replaced by the scan-signal driving circuit 200 and a multiplex 250. The multiplex 250 switches between rows G1A–G4A and rows G1B–G4B.

The second embodiment

Figure 4A:
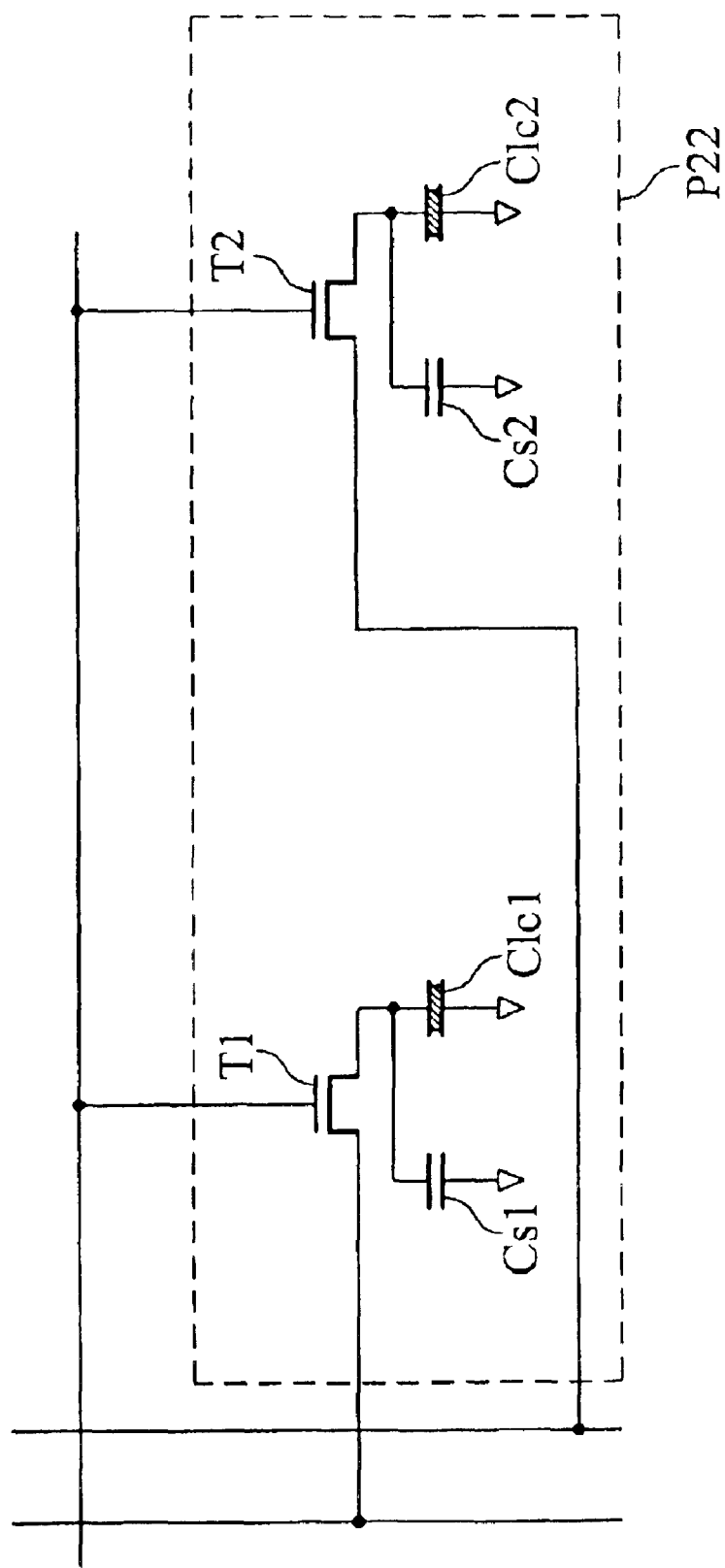
FIG. 4A shows a schematic diagram of a pixel P22 in FIG. 4B.
Figure 4B:
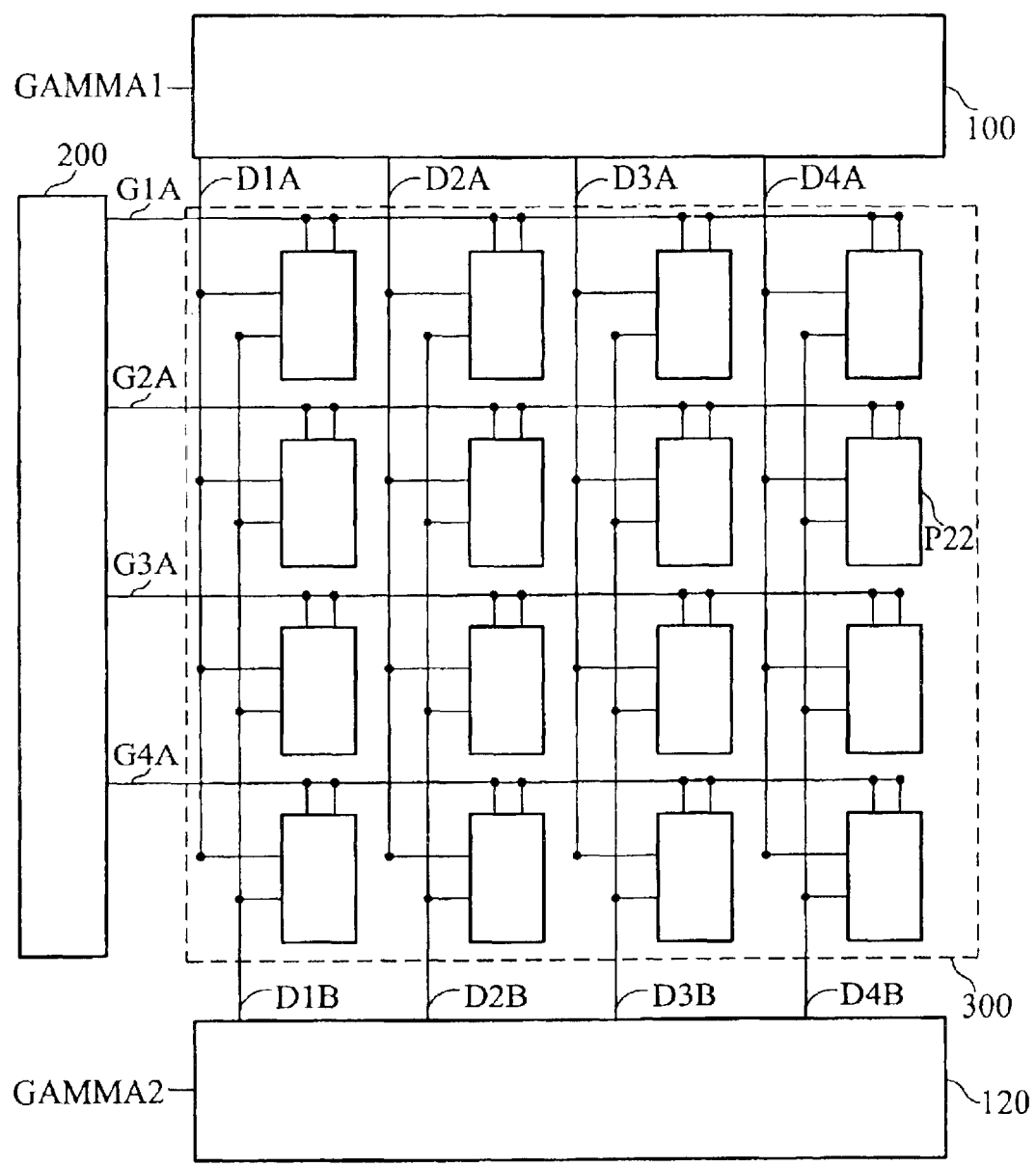
FIG. 4B shows a block diagram of a LCD in the second embodiment.

FIG. 4B shows a block diagram of a LCD in the second embodiment. The LCD includes a TFT transistor array 300, an image-signal driving circuit 100 and 120, and a scan-signal driving circuit 200. FIG. 4A shows a schematic diagram of a pixel P22 in FIG. 4B. Other pixels in FIG. 4B have the same schematic as shown in FIG. 4A. The pixel P22 has a reflective region 10 and a transmission region 20, and thus requires two sets of TFT transistors and storage capacitors.

The TFT transistor T1 is disposed at the intersection of row G2A and column D2A. A gate of the TFT transistor T1 is coupled to row G2A, a drain of the TFT transistor T1 is coupled to column D2A, and a source of the TFT transistor T1 is coupled to Clc1 and storage capacitor Cs1. The TFT transistor T2 is disposed at the intersection of row G2A and column D2B. A gate of the TFT transistor T1 is coupled to row G2A, a drain of the TFT transistor T2 is coupled to column D2B, and a source of the TFT transistor T2 is coupled to Clc2 and storage capacitor Cs2. All Pixels in the TFT transistor array 300 have the same wiring structure.

The scan-signal driving circuit 200 generates scan signals fed to gates of TFT transistors T1 or T2 via rows G1A–G4A. The image-signal driving circuit 100 generates image signals corresponding to scan signals fed to reflective region Clc1 via columns D1A–D4A and TFT transistor array 300. The image-signal driving circuit 120 generates image signals corresponding to scan signals fed to transmission region Clc2 via columns D1B–D4B and TFT transistor array 300.

Figure 4C:
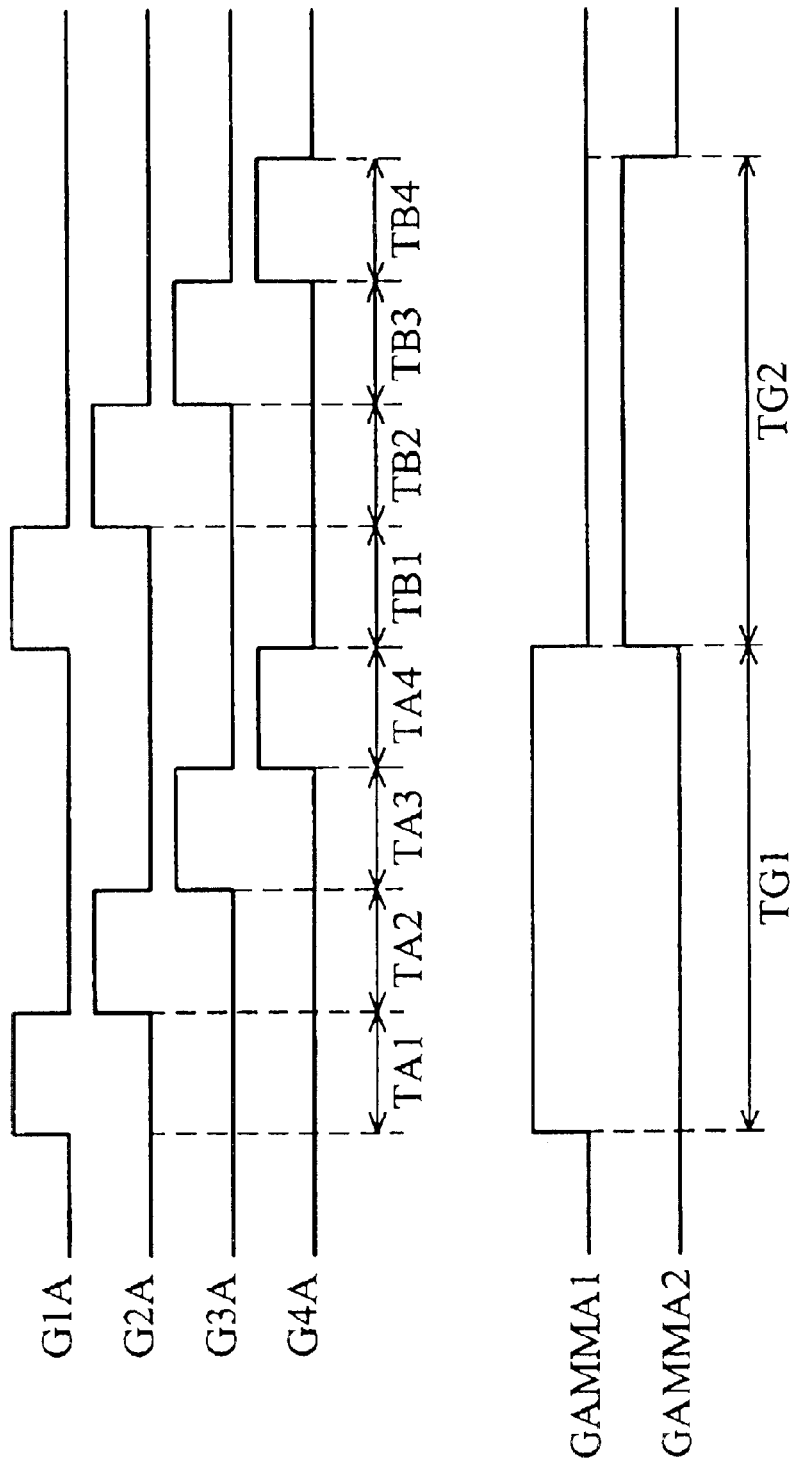
FIG. 4C shows a diagram of all waveforms in FIG. 4B.

A driving method in the second embodiment scans all reflective regions first, and all transmission regions later in a frame periods fd1. FIG. 4C shows a diagram of all waveforms in FIG. 4B. The GAMMA1 can select the reflectivity gamma curve RV1 or RV2, thereby transferring the image signals. The GAMMA2 can select the transmittance gamma curve TV1 or TV2, thereby transferring the image signals. As shown in FIG. 4C, a frame period fd1 is divided into a GAMMA1 period TG1 and a GAMMA2 period TG2. In GAMMA1 period TG1, the image-signal driving circuit 100 feeds image signals to reflective region Clc1 and storage capacitor Cs1 via columns D1A–D4A in periods TA1, TA2, TA3, and TA4, when rows G1A–G4A are active respectively. In GAMMA2 period TG2, the image-signal driving circuit 120 feeds image signals to transmission regions Clc2 and storage capacitors Cs2 via columns D1B–D4B in periods TB1, TB2, TB3, and TB4, when rows G1A–G4A are active respectively.

Figure 4D:
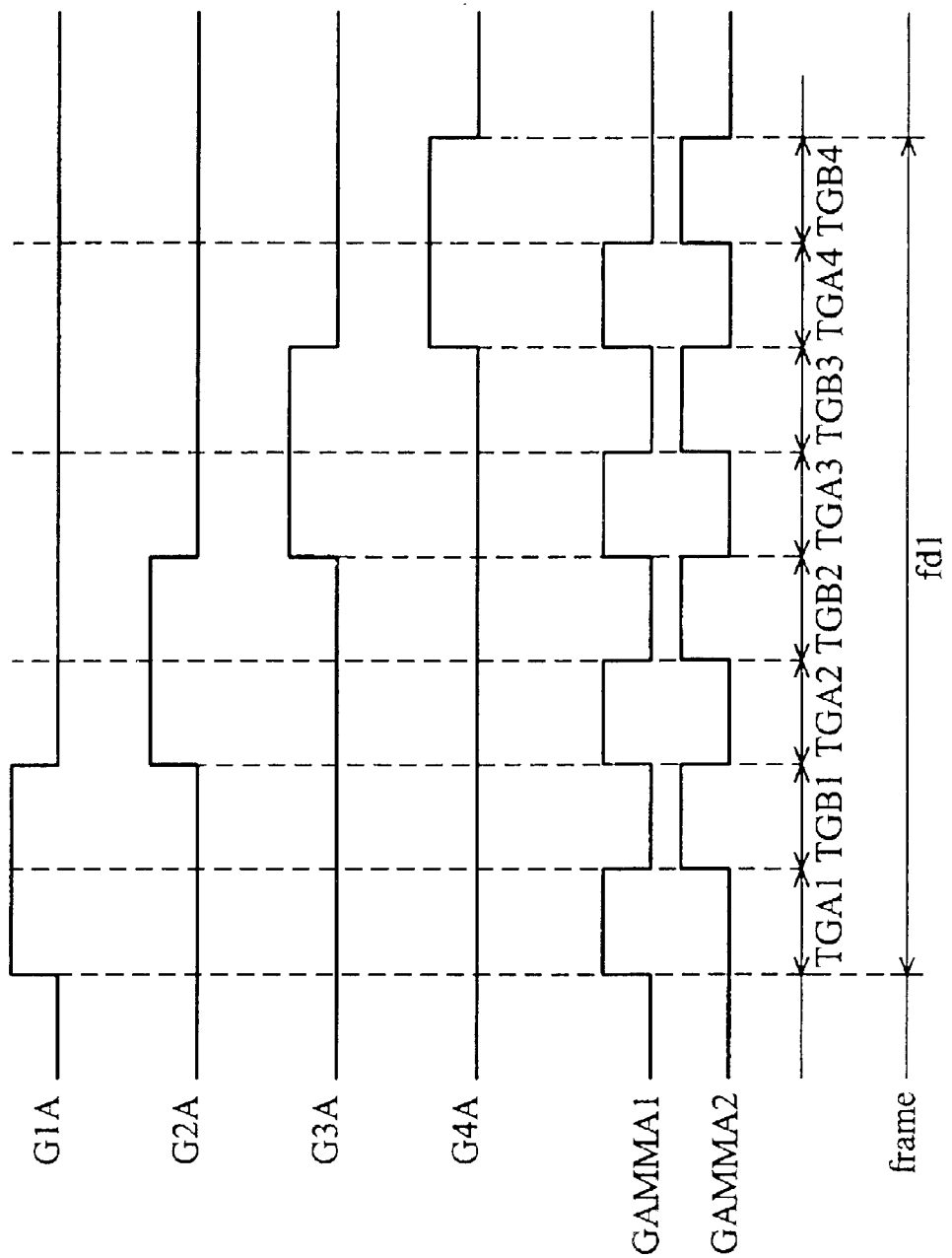
FIG. 4D shows a diagram of all waveforms in FIG. 4B.

Another driving method in the second embodiment scans all reflective regions of one row first in the row's active period, and all transmission regions of the row later in the row's active period. FIG. 4D shows a diagram of all waveforms in FIG. 4B. As shown in FIG. 4D, in a frame fd1, GAMMA1 is active in periods TGA1, TGA2, TGA3, TGA4, and GAMMA2 is active in periods TGB1, TGB2, TGB3, and TGB4. Rows are active in sequence periods G1A-G2A-G3A-G4A. Row G1A is active in periods TGA1, TGB1 corresponding to GAMMA1 and GAMMA2 becoming active alternatively. Row G2A is active in periods TGA2, TGB2 corresponding to GAMMA1 and GAMMA2 becoming active alternatively. Row G3A is active in periods TGA3, TGB3 corresponding to GAMMA1 and GAMMA2 becoming active alternatively. Row G4A is active in periods TGA4, TGB4 corresponding to GAMMA1 and GAMMA2 becoming active alternatively. In periods TGA1, TGA2, TGA3, and TGA4, the image-signal driving circuit 100 feeds image signals to reflective region Clc1 and storage capacitor Cs1 via columns D1A–D4A in periods that rows G1A–G4A are active respectively. In periods TGB1, TGB2, TGB3, and TGB4, the image-signal driving circuit 120 feeds image signals to reflective region Clc2 and storage capacitor Cs2 via columns D1B–D4B in periods when rows G1A–G4A are active respectively.

Figure 4E:
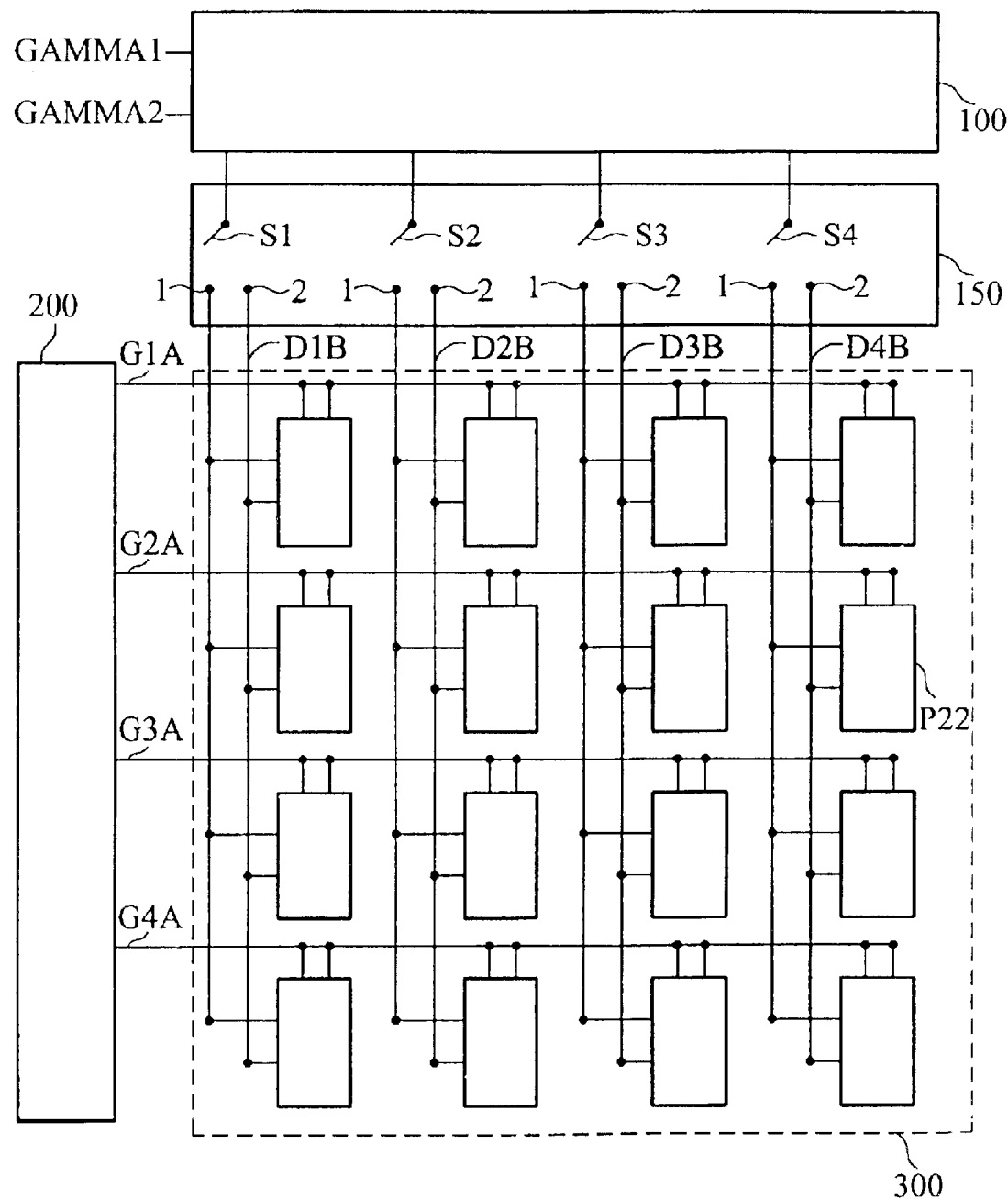
FIG. 4E shows another block diagram of a LCD in the second embodiment.

The driving method in FIG. 4E is the same as that in 4B. The image-signal driving circuit 100 and 120 are replaced by the image-signal driving circuit 100 and a multiplex 150. The multiplex 150 switches between columns D1A–D4A and columns D1B–D4B.

The third embodiment

Figure 5A:
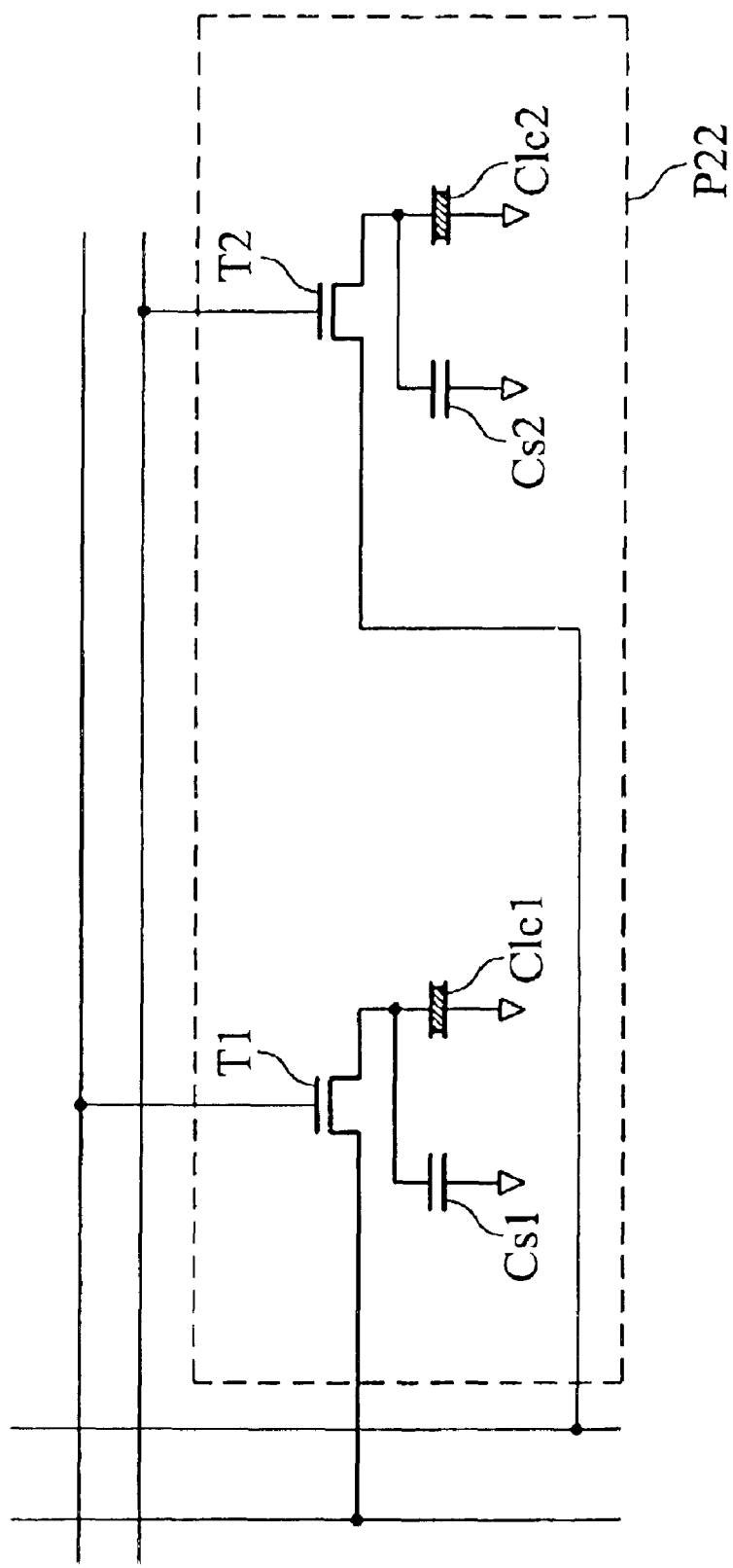
FIG. 5A shows a schematic diagram of a pixel P22 in FIG. 5B.
Figure 5B:
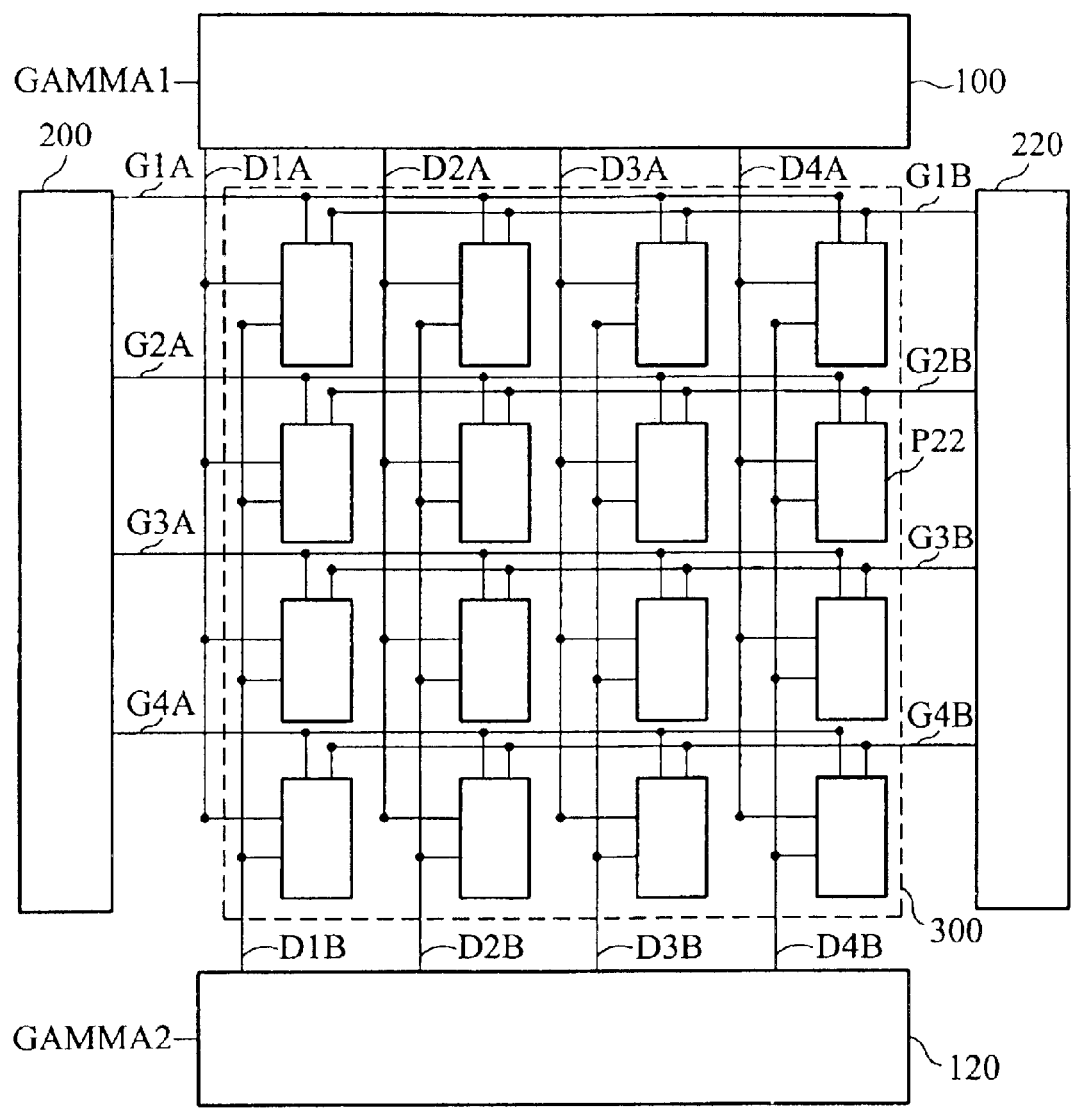
FIG. 5B shows a block diagram of a LCD in the third embodiment.

FIG. 5B shows a block diagram of a LCD in the first embodiment. The LCD includes a TFT transistor array 300, an image-signal driving circuit 100,120, and a scan-signal driving circuit 200,220. FIG. 5A shows a schematic diagram of a pixel P22 in FIG. 5B. Other pixels in FIG. 5B have the same schematic as shown in FIG. 5A. The pixel P22 has a reflective region 10 and a transmission region 20, and thus requires two sets of TFT transistors and storage capacitors.

The TFT transistor T1 is disposed at the intersection of row G2A and column D2A. A gate of the TFT transistor T1 is coupled to row G2A, a drain of the TFT transistor T1 is coupled to column D2A, and a source of the TFT transistor T1 is coupled to Clc1 and storage capacitor Cs1. The TFT transistor T2 is disposed at the intersection of row G2B and column D2B. A gate of the TFT transistor T1 is coupled to row G2B, a drain of the TFT transistor T1 is coupled to column D2B, and a source of the TFT transistor T2 is coupled to Clc2 and storage capacitor Cs2. All Pixels in the TFT transistor array 300 have the same wiring structure.

The scan-signal driving circuit 200 generates scan signals fed to gates of TFT transistors T1 via rows G1A–G4A. The scan-signal driving circuit 220 generates scan signals fed to gates of TFT transistors T2 via rows G1B–G4B. The image-signal driving circuit 100 generates image signals corresponding to scan signals fed to reflective region Clc1 via columns D1A–D4A and TFT transistor array 300. The image-signal driving circuit 120 generates image signals corresponding to scan signals fed to transmission region Clc2 via columns D1B–D4B and TFT transistor array 300.

A driving method in the third embodiment scans all reflective regions first in a frame period fd1, and all transmission regions later. FIG. 3C shows a diagram of all waveforms in FIG. 5B. The GAMMA1 can select the reflectivity gamma curve RV1 or RV2, thereby transferring the image signals. The GAMMA2 can select the transmittance gamma curve TV1 or TV2, thereby transferring the image signals. As shown in FIG. 3C, a frame period fd1 is divided into a GAMMA1 period TG1 and a GAMMA2 period TG2. In GAMMA1 period TG1, the image-signal driving circuit 100 feeds image signals to reflective regions Clc1 and storage capacitors Cs1 via columns D1A–D4A in periods TA1, TA2, TA3, and TA4, when rows G1A–G4A are active respectively. In GAMMA2 period TG2, the image-signal driving circuit 100 feeds image signals to transmission regions Clc2 and storage capacitors Cs2 via columns D1A–D4A in periods TB1, TB2, TB3, and TB4, when rows G1B–G4B are active respectively.

Another driving method in the third embodiment scans all reflective regions of one row first in the row's active period, and all transmission regions of one row scanned later in the row's active period. FIG. 3D shows a diagram of all waveforms in FIG. 5B. As shown in FIG. 3D, in a frame fd1, GAMMA1 is active in periods TGA1, TGA2, TGA3, TGA4, and GAMMA2 is active in periods TGB1, TGB2, TGB3, and TGB4. Rows are active in sequence in periods G1A-G1B-G2A-G2B-G3A-G3B-G4A-G4B corresponding to the sequence periods TGA1-TGB1-TGA2-TGB2-TGA3-TGB3-TGA4-TGB4 GAMMA1 and GAMMA2 becoming active alternatively. In periods TGA1, TGA2, TGA3, and TGA4, the image-signal driving circuit 100 feeds image signals to reflective region Clc1 and storage capacitor Cs1 via columns D1A–D4A in periods when rows G1A–G4A are active respectively. In periods TGB1, TGB2, TGB3, and TGB4, the image-signal driving circuit 120 feeds image signals to reflective region Clc2 and storage capacitor Cs2 via columns D1B–D4B when rows G1B–G4B are active respectively.

The fourth embodiment

Figure 6:
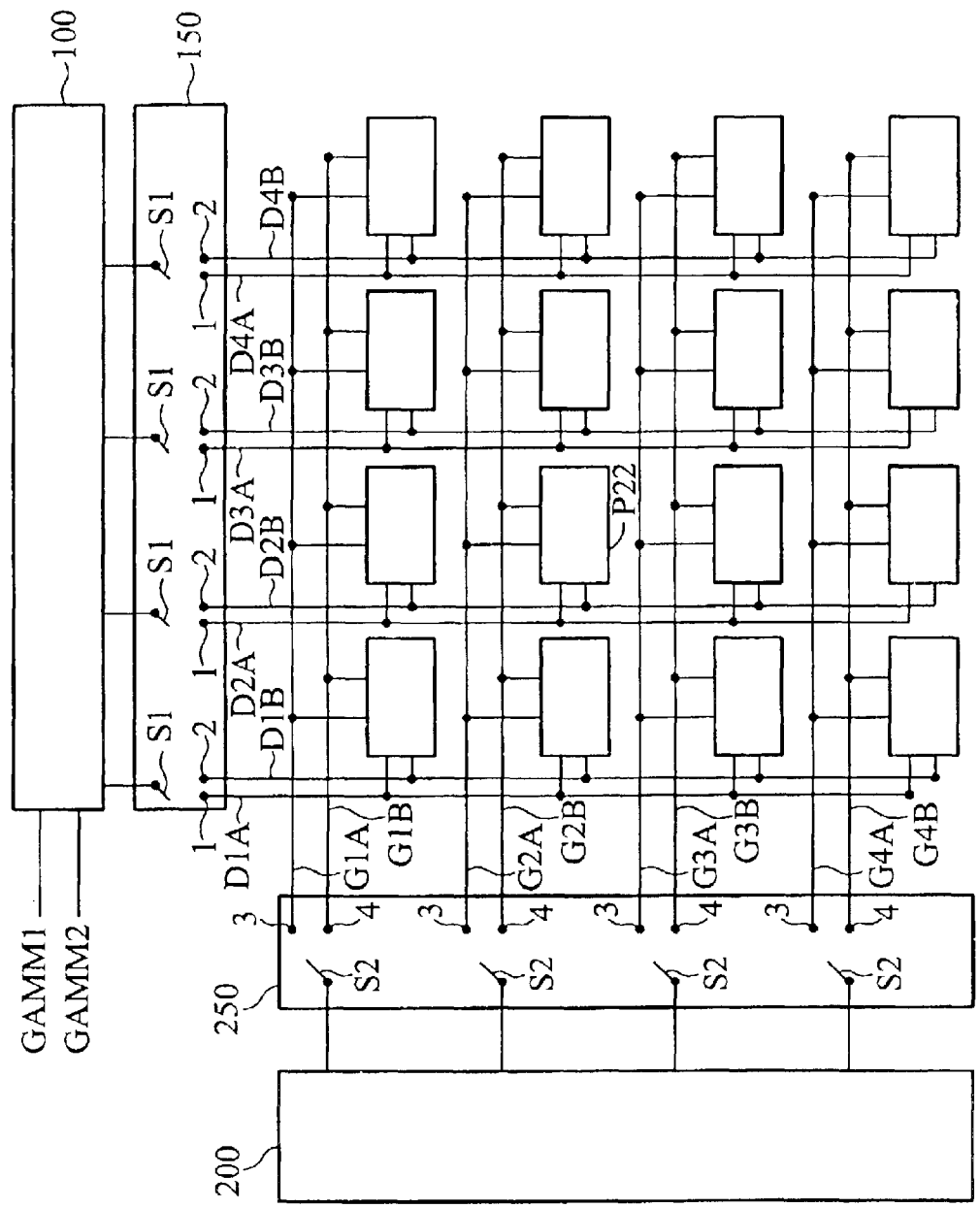
FIG. 6 shows a block diagram of a LCD in the fourth embodiment.
Figure 7A:
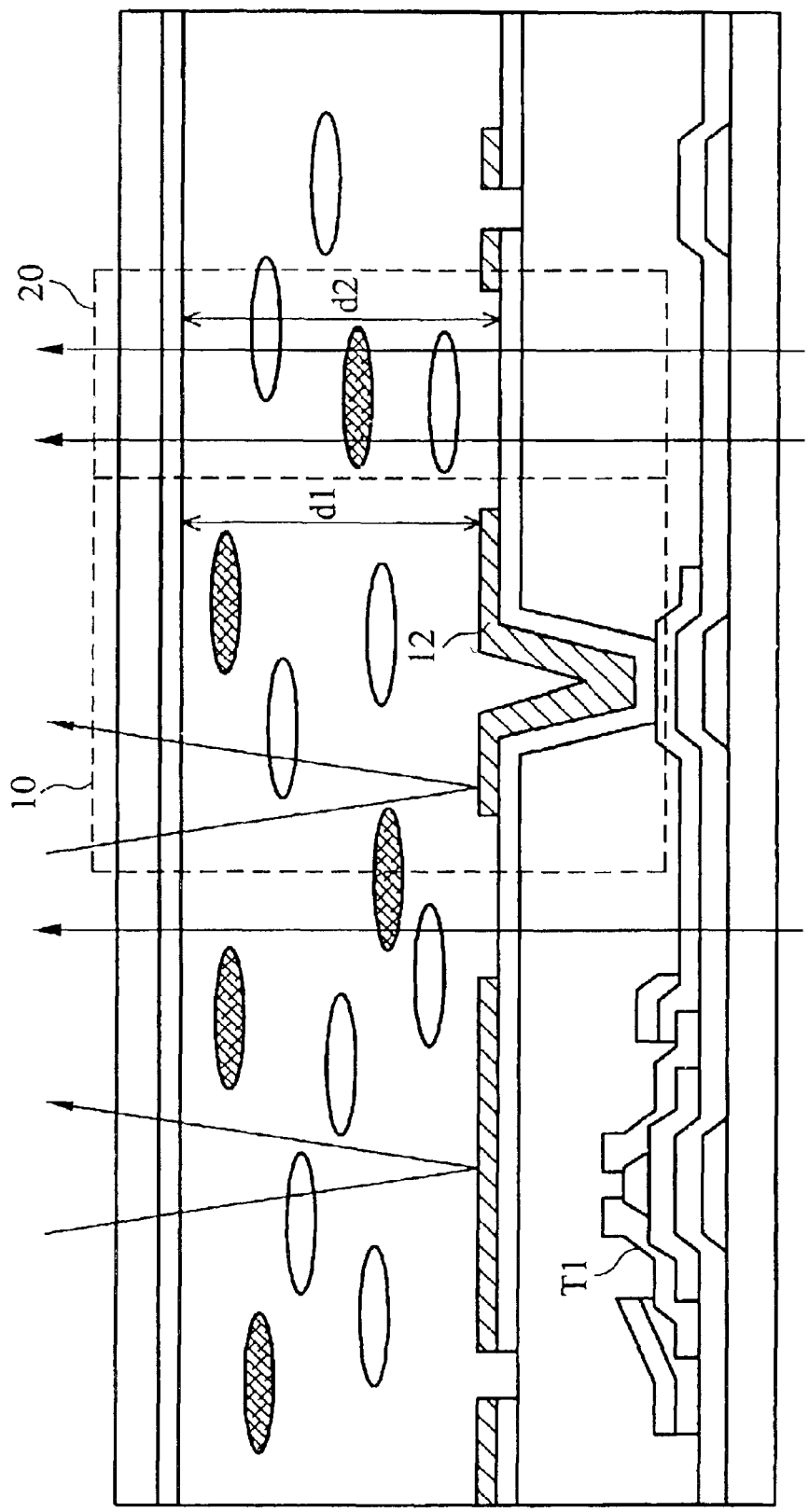
FIG. 7A shows a prospective diagram of a pixel of a conventional transflective LCD.
Figure 7B:
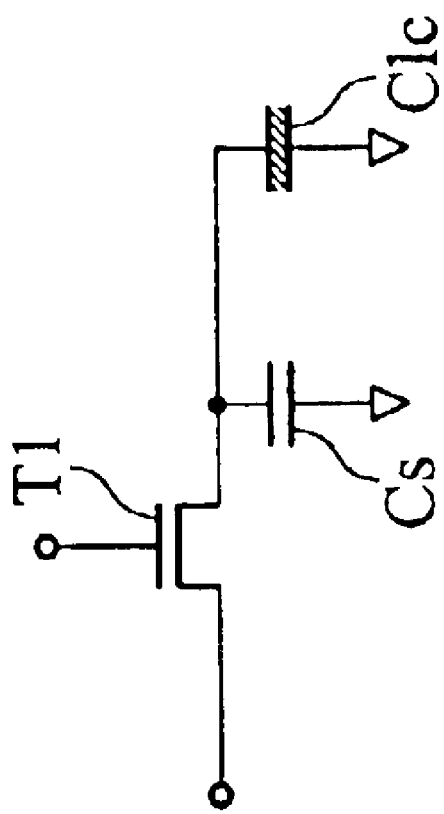
FIG. 7B shows an equivalent circuit of the pixel in FIG. 7A.

FIG. 6B shows a block diagram of a LCD in the first embodiment. The LCD includes a TFT transistor array 300, an image-signal driving circuit 100, a scan-signal driving circuit 200, and multiplex 150, 250. FIG. 5A shows a schematic diagram of a pixel P22 in FIG. 6B. Other pixels in FIG. 6B have the same schematic as shown in FIG. 5A.

The scan-signal driving circuit 200 generates scan signals fed to gates of TFT transistors T1 via rows G1A–G4A selected by the multiplex 250 or to gates of TFT transistors T2 via rows G1B–G4B selected by the multiplex 250. The image-signal driving circuit 100 generates image signals corresponding to scan signals fed to reflective region Clc1 via columns D1A–D4A selected by the multiplex 150 and TFT transistor array 300 or to transmission region Clc2 via columns D1B–D4B selected by the multiplex 150 and TFT transistor array 300.

A driving method in the fourth embodiment scans all reflective regions first in a frame period fd1, and all transmission regions later. FIG. 3C shows a diagram of all waveforms in FIG. 6B. The GAMMA1 can select the reflectivity gamma curve RV1 or RV2, thereby transferring the image signals. The GAMMA2 can select the transmittance gamma curve TV1 or TV2, thereby transferring the image signals. As shown in FIG. 3C, a frame period fd1 is divided into a GAMMA1 period TG1 and a GAMMA2 period TG2. In GAMMA1 period TG1, switches S2 of the multiplex 250 are at position 3, switches S1 of the multiplex 150 are at position 1, and the image-signal driving circuit 100 feeds image signals to reflective region Clc1 and storage capacitor Cs1 via columns D1A–D4A in periods TA1, TA2, TA3, and TA4 that rows G1A–G4A are active respectively. In GAMMA2 period TG2, switches S2 of the multiplex 250 are at position 4, switches S1 of the multiplex 150 are at position 2, and the image-signal driving circuit 100 feeds image signals to transmission region Clc2 and storage capacitor Cs2 via columns D1B–D4B in periods TB1, TB2, TB3, and TB4 when rows G1B–G4B are active respectively.

Another driving method in the fourth embodiment scans all reflective regions of one row first in the row's active period, and all transmission regions later in the row's active period. FIG. 3D shows a diagram of all waveforms in FIG. 6B. As shown in FIG. 3D, in a frame fd1, GAMMA1 is active in periods TGA1, TGA2, TGA3, TGA4, switches S1 of the multiplex 150 are at position 1, and switches S2 of the multiplex 250 are at position 3. In a frame fd1, GAMMA2 is active in periods TGB1, TGB2, TGB3, and TGB4, switches S1 of the multiplex 150 are at position 2, and switches S2 of the multiplex 250 are at position 4. Rows are active in sequence periods G1A-G1B-G2A-G2B-G3A-G3B-G4A-G4B corresponding to the sequence periods TGA1-TGB1-TGA2-TGB2-TGA3-TGB3-TGA4-TGB4 when GAMMA1 and GAMMA2 are active alternatively. In period TGA1, TGA2, TGA3, and TGA4, the image-signal driving circuit 100 feeds image signals to reflective region Clc1 and storage capacitor Cs1 via columns D1A–D4A in periods when rows G1A–G4A are active respectively. In period TGB1, TGB2, TGB3, and TGB4, the image-signal driving circuit 100 feeds image signals to reflective region Clc2 and storage capacitor Cs2 via columns D1B–D4B in periods that rows G1B–G4B are active respectively.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A transflective LCD (liquid crystal display) comprising:
plural pixels wherein each pixel comprises a reflective region and a transmission region, wherein the reflective region has a first storage capacitor and a first active device, the first active device receiving a first driving voltage and coupling to the first capacitor, and the transmission region has a second storage capacitor and a second active device, the second active device receiving a second driving voltage and coupling to the second capacitor.

2. The transflective LCD as claimed in claim 1, wherein:
the reflective region has a first liquid-crystal layer with a first cell gap; and
the transmission region has a second liquid-crystal layer with a second cell gap.

3. The transflective LCD as claimed in claim 1, wherein:
the first driving voltage is generated according to a reflective gamma curve; and
the second driving voltage is generated according to a transmission gamma curve.

4. The transflective LCD as claimed in claim 3, wherein:
the reflective gamma curve is used for quarter wave mode; and
the transmission gamma curve is used for quarter wave mode.

5. The transflective LCD as claimed in claim 3, wherein:
the reflective gamma curve is used for half wave mode; and
the transmission gamma curve is used for half wave mode.

6. The transflective LCD as claimed in claim 3, wherein:
the reflective gamma curve is used for half wave mode; and
the transmission gamma curve is used for quarter wave mode.

7. The transflective LCD as claimed in claim 3, wherein:
the reflective gamma curve is used for quarter wave mode; and
the transmission gamma curve is used for half wave mode.

8. The transflective LCD as claimed in claim 3, wherein:
the reflective region has a first liquid-crystal layer with a first cell gap;
the transmission region has a second liquid-crystal layer with a second cell gap;
the reflective gamma curve is in according to a phase difference through the first cell gap; and
the transmission gamma curve is in according to another phase difference through the second cell gap.

9. The transflective LCD as claimed in claim 1, wherein:
the first active device has a first control end coupled to a first scan line;
the second active device has a second control end coupled to a second scan line; and
the first driving voltage and the second driving voltage are provided by a first driving line at different times.

10. The transflective LCD as claimed in claim 9, further comprising:
a first scan-signal driving circuit coupled to the first scan line;
a second scan-signal driving circuit coupled to the second scan line; and
a first image-signal driving circuit coupled to the first driving line.

11. The transflective LCD as claimed in claim 9, further comprising:
a multiplex coupled to the first scan line and the second scan line;
a first scan-signal driving circuit coupled to the multiplex; and
a first image-signal driving circuit coupled to the first driving line.

12. The transflective LCD as claimed in claim 1, wherein:
the first active device has a first control end;
the second active device has a second control end; wherein the first control end and the second control end are enabled by a first scan line at different times;

the first driving voltage is provided by a first driving line; and the second driving voltage is provided by a second driving line.

13. The transflective LCD as claimed in claim 12, wherein:
   a first image-signal driving circuit coupled to the first driving line;
   a second image-signal driving circuit coupled to the second driving line; and
   a first scan-signal driving circuit coupled to the first scan line.

14. The transflective LCD as claimed in claim 12, wherein:
   a multiplex coupled to the first driving line and the second driving line;
   a first image-signal driving circuit coupled to the multiplex; and
   a first scan-signal driving circuit coupled to the first scan line.

15. The transflective LCD as claimed in claim 1, wherein:
   the first active device has a first control end coupled to the first scan line;
   the second active device has a second control end coupled to the second scan line;
   the first driving voltage is provided by a first driving line; and
   the second driving voltage is provided by a second driving line.

16. The transflective LCD as claimed in claim 15, further comprising:
   a first image-signal driving circuit coupled to the first driving line;
   a second image-signal driving circuit coupled to the second driving line;
   a first scan-signal driving circuit coupled to the first scan line; and
   a second scan-signal driving circuit coupled to the second scan line.

17. The transflective LCD as claimed in claim 15, further comprising:
   a first multiplex coupled to the first driving line and the second driving line;
   a first image-signal driving circuit coupled to the first multiplex;
   a second multiplex coupled to the first scan line and the second scan line; and
   a first scan-signal driving circuit coupled to the second multiplex.

* * * * *